(12) United States Patent
Lewis et al.

(10) Patent No.: US 12,100,910 B2
(45) Date of Patent: Sep. 24, 2024

(54) SHAPE-MEMORY ALLOY LOCK FOR CONNECTORS

(71) Applicant: INTERNATIONAL BUSINESS MACHINES CORPORATION, Armonk, NY (US)

(72) Inventors: Theron Lee Lewis, Rochester, MN (US); David J. Braun, St. Charles, MN (US); James D. Bielick, Pine Island, MN (US); John R. Dangler, Rochester, MN (US); Timothy P. Younger, Rochester, MN (US); Timothy Jennings, Rochester, MN (US); Jennifer I. Bennett, Rochester, MN (US); Stephen Michael Hugo, Stewartville, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/457,737

(22) Filed: Dec. 6, 2021

(65) Prior Publication Data

US 2023/0178922 A1 Jun. 8, 2023

(51) Int. Cl.
*H01R 13/516* (2006.01)
*H01R 12/57* (2011.01)
*H01R 43/02* (2006.01)

(52) U.S. Cl.
CPC ....... *H01R 13/516* (2013.01); *H01R 43/0256* (2013.01); *F16B 2200/77* (2023.08); *H01R 12/57* (2013.01)

(58) Field of Classification Search
CPC ..... F16B 1/0014; H01R 12/57; H01R 13/516; H01R 43/57; H01R 12/596; H01R 12/75;
(Continued)

(56) References Cited

U.S. PATENT DOCUMENTS 3,801,954 A 4/1974 Dorrell
4,775,334 A 10/1988 Jarry
(Continued)

FOREIGN PATENT DOCUMENTS

CN 107408774 A 11/2017
EP 2302230 A2 3/2011

OTHER PUBLICATIONS

International Search Report and Written Opinion of International Application No. PCT/CN2022/129635, Mailed: Dec. 23, 2022, 9 pages.

(Continued)

*Primary Examiner* — Minh N Trinh
(74) *Attorney, Agent, or Firm* — Tihon Poltavets

(57) ABSTRACT

A first apparatus includes an electrical connector with an outer shell and an inner wafer, where the inner wafer is configured to slide into a cavity of the outer shell. The first apparatus further includes a shape-memory alloy coupled to a void in the outer shell and configured to interfere with an area on the inner wafer. A second apparatus includes an OTS connector with an outer shell and an inner wafer, where the inner wafer is configured to slide into a cavity of the outer shell. The second apparatus further includes a plurality of SMT leads of the inner wafer configured to mount onto a plurality of landing pads on a PCBA. The second apparatus includes a shape-memory alloy coupled to a void in the outer shell and configured to interfere with the inner wafer preventing movement of the inner wafer within the outer shell of OTS connector.

13 Claims, 7 Drawing Sheets

(58) Field of Classification Search
CPC .............. H01R 13/6275; H01R 13/629; H01R 13/6471; H01R 13/6587
See application file for complete search history.

(56) References Cited

U.S. PATENT DOCUMENTS

| | | | |
|---|---|---|---|
| 4,793,821 | A | 12/1988 | Fowler |
| 6,402,552 | B1 | 6/2002 | Wagner |
| 7,413,461 | B2 | 8/2008 | Dawiedczyk |
| 9,138,274 | B1 | 9/2015 | Biesinger |
| 10,058,015 | B2 | 8/2018 | Robinson |
| 10,243,305 | B1* | 3/2019 | Pan .................... H01R 13/6582 |
| 11,011,873 | B2 | 5/2021 | Peloza |
| 2002/0137390 | A1 | 9/2002 | Jarvis |
| 2016/0079720 | A1* | 3/2016 | Zhong .................... H01R 24/66 439/660 |
| 2018/0076570 | A1 | 3/2018 | Huhmann |
| 2021/0075143 | A1 | 3/2021 | Laurx |
| 2022/0173545 | A1* | 6/2022 | Ishikawa .............. H01R 13/506 |

OTHER PUBLICATIONS

Lewis et al., "Shape-Memory Alloy Lock for Connectors" International Application No. PCT/ CN2022/129635, Filed: Nov. 3, 2022, 25 pages.
Ama, CPT (Current Procedural Terminology), https://www.ama-assn.org/amaone/cpt-current-procedural-terminology, assessed Nov. 19, 2021, pp. 1-10.
Jani et al., "A review of shape memory alloy research, applications and opportunities", https://www.researchgate.net/publication/271851282_A_review_of_shape_memory_alloy_research_applications_and_opportunities, Materials and Desig 56 (2014), pp. 1078-1113.
Molex, "Near Stack High-Speed Cable Assembly Solutions", https://www.molex.com/molex/products/family/nearstack_highspeed_connector_system_and_cable_jumper_assemblies, accessed Aug. 11, 2021,pp. 1-4.
Wikipedia, "Shape-Memory Alloy", https://en.wikipedia.org/wiki/Shape-memory_alloy, accessed Aug. 11, 2021,pp. 1-17.
Youtube, "Nitinol-Metallic Muscles with Shape Memory", https://www.youtube.com/watch?app=desktop&v =-K57cbOhA5g, Jun. 8, 2015,pp. 1-3.

* cited by examiner

SHAPE-MEMORY ALLOY LOCK FOR CONNECTORS

BACKGROUND

This disclosure relates generally to connectors and in particular, to utilizing a shape-memory alloy to lock an outer shell to an inner wafer of a connector.

An on-the-substrate (OTS) connector system typically includes an OTS receptacle cable assembly for electrically connecting to an OTS surface-mount technology (SMT) plug positioned on a substrate, where the substrate electrically connects to a socket on a printed circuit board assembly (PCBA). Subsequent to electrically coupling the OTS receptacle cable assembly to the OTS SMT plug, a substrate underfill adhesive is utilized to bond the OTS connector to the substrate. The OTS receptacle cable assembly includes an inner wafer positioned within an outer shell and plastic, where plastic clip notches provide an interference between the inner wafer and the outer shell. The OTS receptacle cable assembly is typically manufactured by a vendor and shipped to a manufacturer for assembly, where the plastic clip notches are designed to hold the inner wafer to the outer shell during handling.

SUMMARY

One aspect of an embodiment of the present invention discloses an apparatus comprising an electrical connector with an outer shell and an inner wafer, wherein the inner wafer is configured to slide into a cavity of the outer shell. The apparatus further comprises a first end of a shape-memory alloy coupled to a void in the outer shell and configured to interfere with an area on the inner wafer.

One aspect of an embodiment of the present invention discloses an apparatus comprising an on-the-substrate (OTS) connector with an outer shell and an inner wafer, wherein the inner wafer is configured to slide into a cavity of the outer shell. The apparatus further comprises a plurality of surface-mount technology (SMT) leads of the inner wafer configured to mount onto a plurality of landing pads on a printed circuit board assembly (PCBA). The apparatus further comprises a first end of a shape-memory alloy coupled to a void in the outer shell and configured to interfere with the inner wafer preventing movement of the inner wafer within the outer shell of OTS connector.

Another aspect of an embodiment of the present invention discloses a method comprising applying heat to a shape-memory alloy. The method further comprises machining the shape-memory alloy based on dimensions and shape of an outer shell and an inner wafer of a connector. The method further comprises attaching a first end of the shape-memory alloy to a void in a cavity of the outer shell. The method further comprises inserting the inner wafer into the cavity of the outer shell to form the connector. The method further comprises actuating the shape-memory alloy to mechanically engage with a corresponding location on the inner wafer of the connector.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1A:
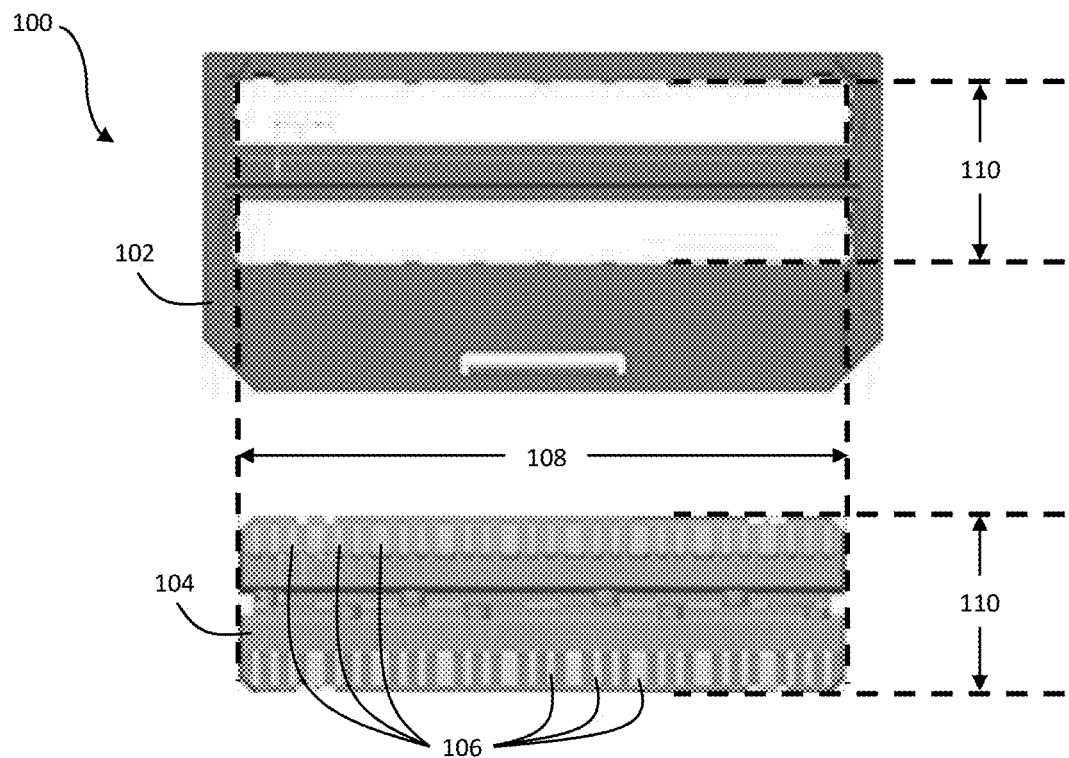
FIG. 1A depicts a front view of a disassembled on-the-substrate (OTS) connector with outer shell and inner wafer, in accordance with an embodiment of the present invention.

Embodiments of the present invention provide an on-the-substrate (OTS) connector with a shape-memory alloy retaining clips to couple an outer shell to an inner wafer. The inner wafer is positioned within the outer shell such that surface-mount technology (SMT) leads of the inner wafer contact corresponding solder paste covered landing pads on a printed circuit board assembly (PCBA) during an attachment process. The SMT leads of the inner wafer protrude in a manner to define a seating plane of the OTS connector. OTS connectors are often assembled by a vendor and subsequently shipped and/or handled to an assembly site, where a position of the outer shell relative to the inner wafer can shift. Presently, plastic retaining clips are utilized to provide an interference between the outer shell and the inner wafer of the OTS connector to prevent any shifting. However, if an amount of interference is too little, the inner wafer can shift within the outer shell and adversely affect the seating plane of the OTS connector. If an amount of interference is too great, a force required to seat the outer shell post reflow of the PCBA can potentially damage the inner wafer and/or break the plastic retailing clips.

Embodiments of the present invention provide memory metal retaining clips for securing the outer shell to the inner wafer of the OTS connector, eliminating plastic deformation to the outer shell. The memory metal retaining clips secure the outer shell to the inner wafer at a specific distance as to not impede the seating plane of the SMT leads. A process for assembling and mounting an on-the-substrate (OTS) connector with shape-memory alloy retaining clips include providing an outer shell and inner wafer for an OTS connector and selecting a memory metal, such as, Nitinol with memory material properties in the 90° C. to 110° C. range. The process includes applying heat to the memory metal and machining the memory metal to a shape for providing an interference (i.e., lock) between the outer shell and the inner wafer. The process includes attaching the machined memory metal at a location on the outer shell to engage with the inner wafer. Subsequent to insertion of the inner wafer into the outer shell to form the OTS connector, the process includes actuating the memory metal to mechanically engage with a corresponding location on the inner wafer of the formed OTS connector. The OTS connector is positioned on a surface of the PCBA and during a reflow process, the memory metal releases (i.e., disengages) the inner wafer from the outer shell. Subsequent to the PCBA with the OTS connector cooling, the outer shell is pressed towards the laminate surfaces and an encapsulant/underfill is applied to the PCBA.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1A depicts a front view of a disassembled on-the-substrate (OTS) connector with outer shell and inner wafer, in accordance with an embodiment of the present invention. OTS connector 100 includes outer shell 102 and inner wafer 104, with multiple SMT leads 106 for placement on corresponding landing pads on a surface of a PCBA. Inner wafer 104 slides into a cavity of outer shell 102 located at a rear area of outer shell 102, where the cavity of outer shell 102 is defined by length 108 and width 110. Prior to sliding inner wafer 104 into outer shell 102, a memory metal is selected for locking inner wafer 104 within the cavity of outer shell 102. Subsequent to selecting the memory metal, heat is applied to the memory metal and the memory metal is machined to a memory metal retaining clip according to a desired position of inner wafer 104 within outer shell 102 of OTS connector 100. The memory metal retaining clip is attached at a location within outer shell 102 to engage with inner wafer 104, where engagement of the memory metal retaining clip secures outer shell 102 to inside wafer 104. In this embodiment, outer shell 102 and inner wafer 104 are associated with OTS connector 100 and serve only as an example embodiment. The invention described herein is applicable to any connector that includes at least outer shell 102 and a component insertable and attachable to outer shell 102.

Figure 1B:
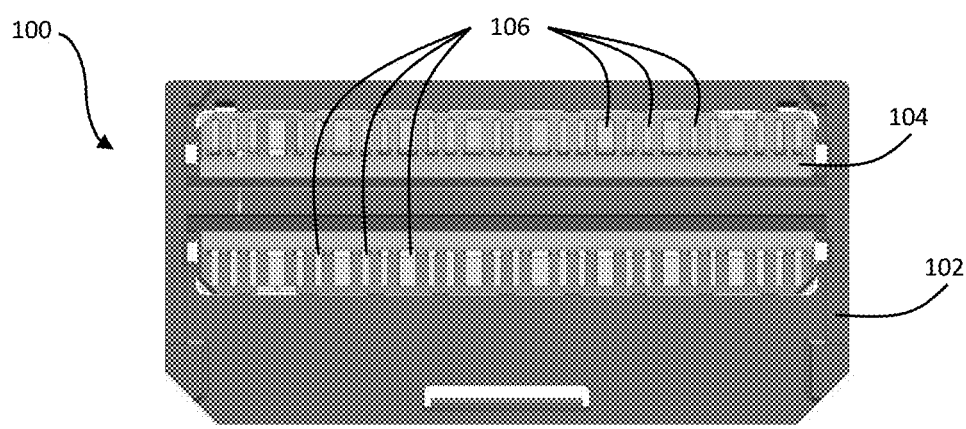
FIG. 1B depicts a front view of an assembled on-the-substrate (OTS) connector with outer shell and inner wafer, in accordance with an embodiment of the present invention.

FIG. 1B depicts a front view of an assembled on-the-substrate (OTS) connector with outer shell and inner wafer, in accordance with an embodiment of the present invention. Subsequent to insertion of inner wafer 104 into outer shell 102, heat is applied to OTS connector 100 to actuate the memory metal retaining clip into an engaged position securing inner wafer 104 to outer shell 102. A position of inner wafer 104 within outer shell 102 is such that SMT leads 106 of inner wafer 104 protrude in a manner to define a seating plane of OTS connector 100. The memory metal retaining clips in an actuated position prevent movement of SMT leads 106 of inner wafer 104 relative to outer shell 102. The memory metal retaining clips secure outer shell 102 to inner wafer 104 at a specific distance as to not impede the seating plane of SMT leads 106, therefore ensuring that SMT leads 106 contact corresponding landing pads upon being placed into a desired position on the PCBA.

Figure 2:
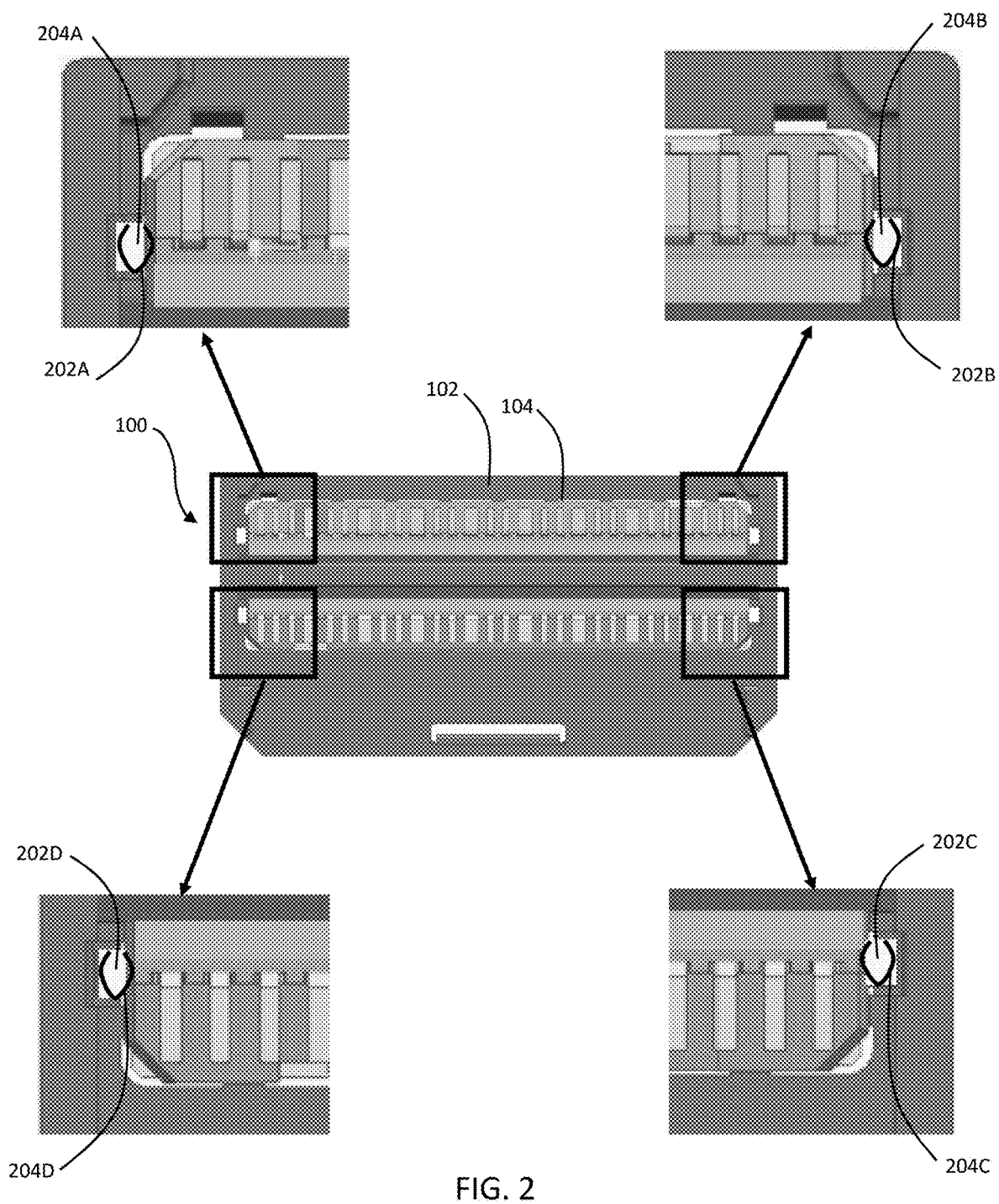
FIG. 2 depicts a front view of an assembled on-the-substrate (OTS) connector with shape-memory alloy retaining clips positioned under the inner wafer prior to reflow, in accordance with an embodiment of the present invention.

FIG. 2 depicts a front view of an assembled on-the-substrate (OTS) connector with shape-memory alloy retaining clips positioned under the inner wafer prior to reflow, in accordance with an embodiment of the present invention. In this embodiment, OTS connector 100 includes four memory metal retaining clips 202A, 202B, 202C, and 202D for securing inner wafer 104 to outer shell 102. It is to be noted, an amount of memory retaining clips 202 for securing inner wafer to outer shell 102 is dependent on a design of OTS connector 100 and an expected amount of force experienced by OTS connector 100 during a shipping and/or handling process. Memory metal retaining clips 202A, 202B, 202C, and 202D are each in an engaged position preventing movement of inner wafer 104 within outer shell 102. In the engaged position each of memory metal retaining clips 202A, 202B, 202C, and 202D are positioned in a respective void 204A, 204B, 204C, and 204D in a cavity of outer shell 102, where interference between inner wafer 104 and each of memory metal retaining clips 202A, 202B, 202C, and 202D prevents the movement of inner wafer 104 within outer shell 102. As inner wafer 104 is inserted into outer shell 102, each of memory metal retaining clips 202A, 202B, 202C, and 202D are actuated to mechanically engage with a respective location on inner wafer 104. In the engaged position, each of memory metal retaining clips 202A, 202B, 202C, and 202D protrude from a respective void 204A, 204B, 204C, and 204D, perpendicular to a movement of inner wafer 104 within outer shell 102. The perpendicular position of each of memory metal retaining clips 202A, 202B, 202C, and 202D, prevents a sliding motion of inner wafer 104 within outer shell 102 during a shipping and/or handling process of OTS connector 100.

Figure 3:
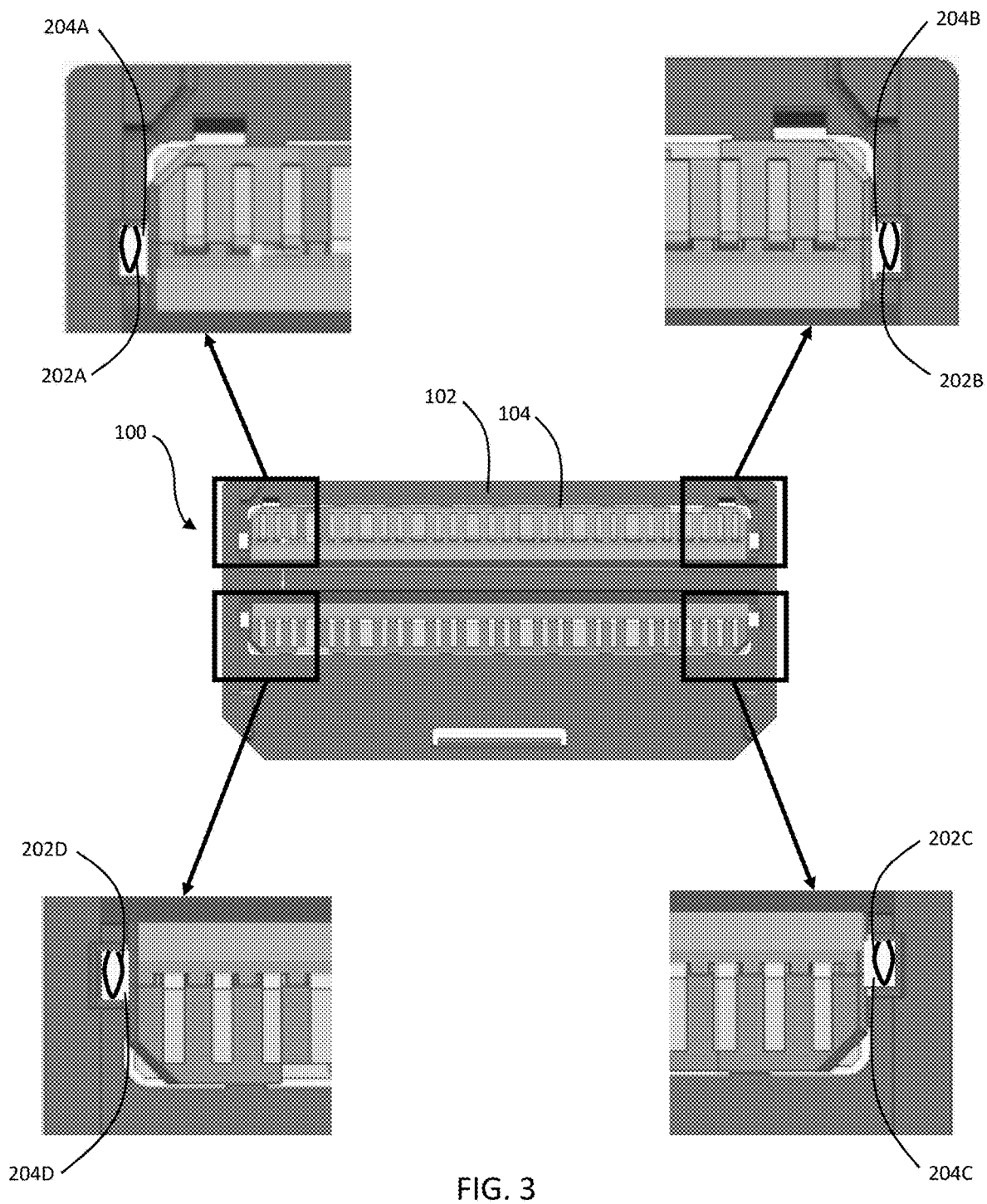
FIG. 3 depicts a front view of an assembled on-the-substrate (OTS) connector with shape-memory alloy retaining clips positioned under the inner wafer subsequent to reflow, in accordance with an embodiment of the present invention.

FIG. 3 depicts a front view of an assembled on-the-substrate (OTS) connector with shape-memory alloy retaining clips positioned under the inner wafer subsequent to reflow, in accordance with an embodiment of the present invention. From the embodiment discussed in FIG. 2, OTS connector 100 includes four memory metal retaining clips 202A, 202B, 202C, and 202D for securing inner wafer 104 to outer shell 102. Memory metal retaining clips 202A, 202B, 202C, and 202D are each in a disengaged position subsequent to a reflow solder process for the PCBA on which OTS connector 100 is installed. In the disengaged position each of memory metal retaining clips 202A, 202B, 202C, and 202D are positioned in a respective void 204A, 204B, 204C, and 204D in a cavity of outer shell 102, where no interference is present between inner wafer 104 and each of memory metal retaining clips 202A, 202B, 202C, and 202D. As a result, inner wafer 104 is released from outer shell 102 during the reflow solder process and subsequent to cooling of the PCBA, outer shell 102 is pressed to the laminate surface of the PCBA. Upon which, an encapsulant/underfill is applied to the surface of the PCBA with OTS connector 100.

Figure 4A:
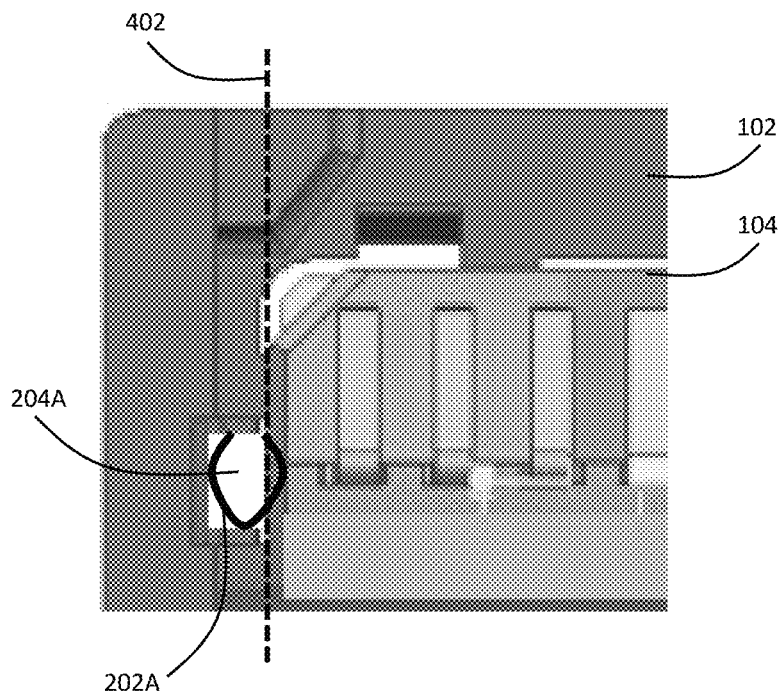
FIG. 4A depicts an enhanced front view of a single shape-memory alloy retaining clip positioned under the inner wafer prior to reflow, in accordance with an embodiment of the present invention.

FIG. 4A depicts an enhanced front view of a single shape-memory alloy retaining clip positioned under the inner wafer prior to reflow, in accordance with an embodiment of the present invention. The enhanced view of memory metal retaining clip 202A within void 204A illustrates a single corner of outer shell 102 and inner wafer 104. Interference plane 402 represents a clearance line between inner wafer 104 and memory metal retaining clip 202A attached to outer shell 102 in void 204A. Interference plane 402 is parallel to a sliding direction of inner wafer 104 within outer shell 102. In an engaged position prior to reflow, memory metal retaining clip 202A is engaged and crosses interference plane 402, thus preventing any movement of inner wafer 104 within outer shell 102. In this embodiment, a first end of memory metal retaining clip 202A is attached to a surface within void 204A and a second end of memory metal retaining clip 202A is not attached to any surface. Inner wafer 104 includes an area into which memory metal retaining clip 202A can actuate into upon crossing interference plane 402.

Figure 4B:
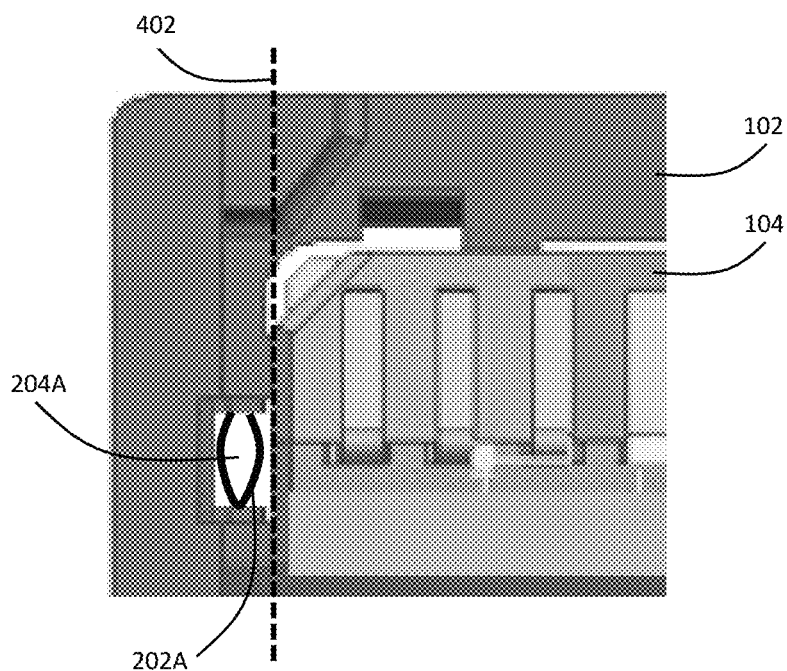
FIG. 4B depicts an enhanced front view of a single shape-memory alloy retaining clip positioned under the inner wafer subsequent to reflow, in accordance with an embodiment of the present invention.

FIG. 4B depicts an enhanced front view of a single shape-memory alloy retaining clip positioned under the inner wafer subsequent to reflow, in accordance with an embodiment of the present invention. From the enhanced view of FIG. 4A, this embodiment illustrates a single corner of outer shell 102 and inner wafer 104 with memory metal retaining clip 202A positioned within void 204A. As previously discussed, interference plane 402 represents a clearance line between inner wafer 104 and memory metal retaining clip 202A attached to outer shell 102 in void 204A. In a disengaged position subsequent to reflow, memory metal retaining clip 202A does not cross interference plane 402, thus allowing for movement of outer shell 102 from inner wafer 104. In this embodiment, a first end of memory metal retaining clip 202A is attached to a surface within void 204A and a second end of memory metal retaining clip 202A is not attached to any surface. It is to be noted, dimension and shape of each memory metal retaining clip is dependent on dimensions and shape of outer shell 102 and inner wafer 104 of OTS connector 100.

Figure 5A:
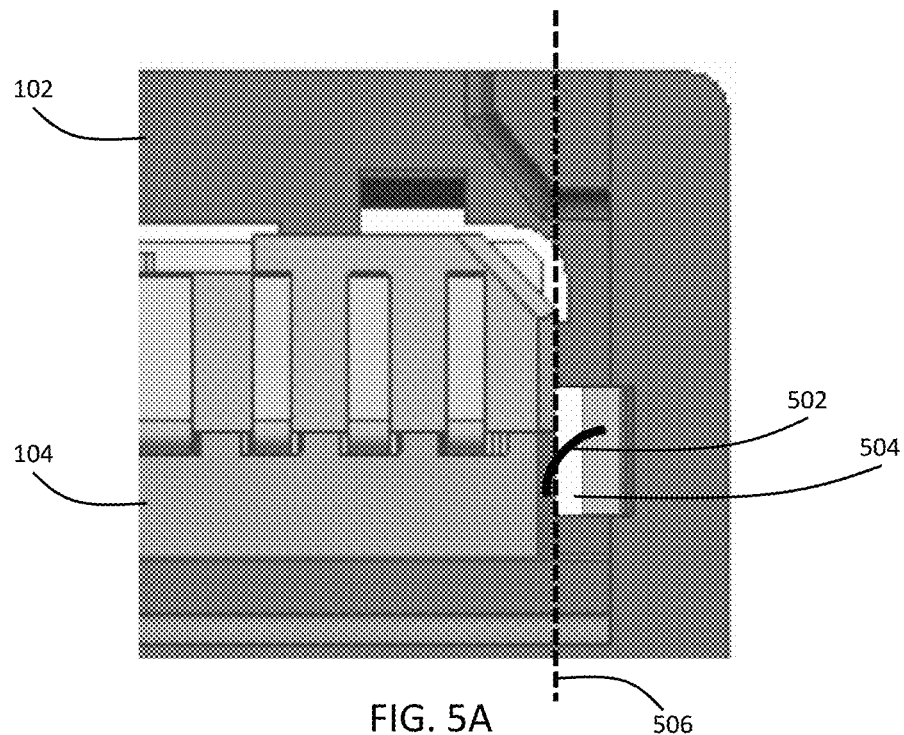
FIG. 5A depicts an enhanced front view of a single shape-memory alloy retaining clip positioned within the inner wafer prior to reflow, in accordance with an embodiment of the present invention.

FIG. 5A depicts an enhanced front view of a single shape-memory alloy retaining clip positioned within the inner wafer prior to reflow, in accordance with an embodiment of the present invention. In this embodiment, the enhanced view of memory metal arm 502 attached to outer shell 102 within void 504 illustrates a single corner of outer shell 102 and inner wafer 104. Interference plane 506 represents a clearance line between inner wafer 104 and memory metal arm 502 attached to outer shell 102 in void 504. In the engaged position, memory metal arm 502 is positioned across the interference plane 506 prior to reflow, thus preventing movement of inner wafer 104 within outer shell 102. In this embodiment, a first end of memory metal arm 502 is attached to a surface within void 504 and a second end of memory metal arm 502 is not attached to any surface and free to move upon actuation with applied heat. Subsequent to inserting inner wafer 104 into outer shell 102, memory metal arm 502 is actuated and mechanical engages with a corresponding area on inner wafer 104. Inner wafer 104 includes a corresponding area where memory metal arm 502 latches onto upon crossing interference plane 502. Memory metal arm 502 is positioned within an area of outer shell 102 and inner wafer 104, such that memory metal arm 502 engages with an edge of inner wafer 104. The position of memory metal arm 502 is such that minimal or no redesigning of either outer shell 102 or inner wafer 104 is necessary to accommodate memory metal arm 502.

Figure 5B:
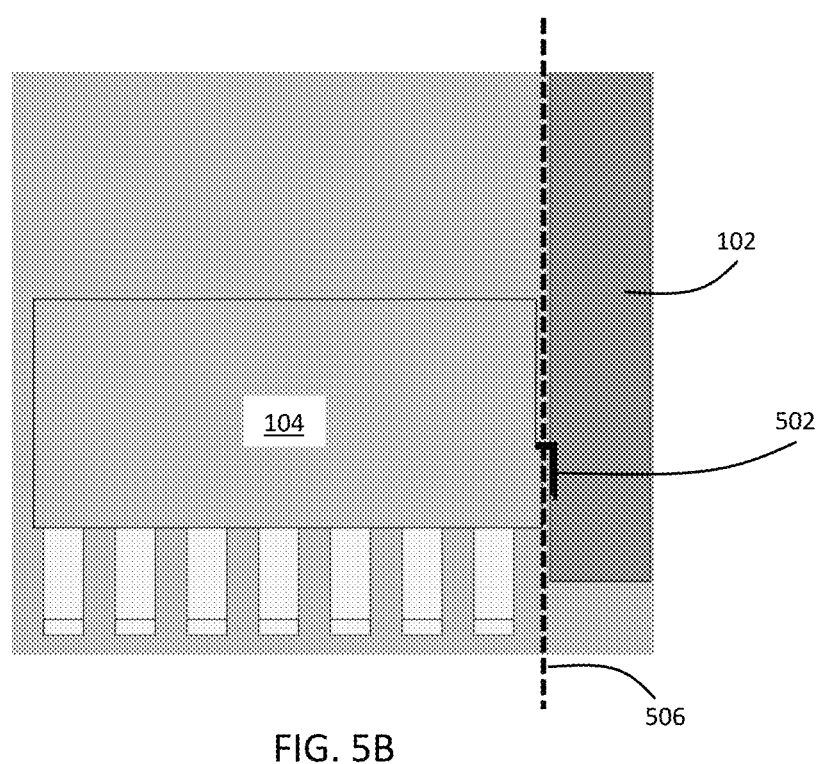
FIG. 5B depicts an enhanced cutaway side view of a single shape-memory alloy retaining clip positioned within the inner wafer prior to reflow, in accordance with an embodiment of the present invention.

FIG. 5B depicts an enhanced cutaway side view of a single shape-memory alloy retaining clip positioned within the inner wafer prior to reflow, in accordance with an embodiment of the present invention. The enhanced cutaway side view of the embodiment discussed in FIG. 5A illustrates outer shell 102 and inner wafer 104, where memory metal arm 502 is in an engaged position. In the engaged position, a portion of memory metal arm 502 crossed interference plane 506, thus preventing inner wafer 104 from sliding within outer shell 102 perpendicular to interference plane 506. It is to be noted, a memory metal arm is placeable at each corner of outer shell 102 for interfering with inner wafer 104, similar to the embodiment discussed with regards to FIG. 2.

Figure 6A:
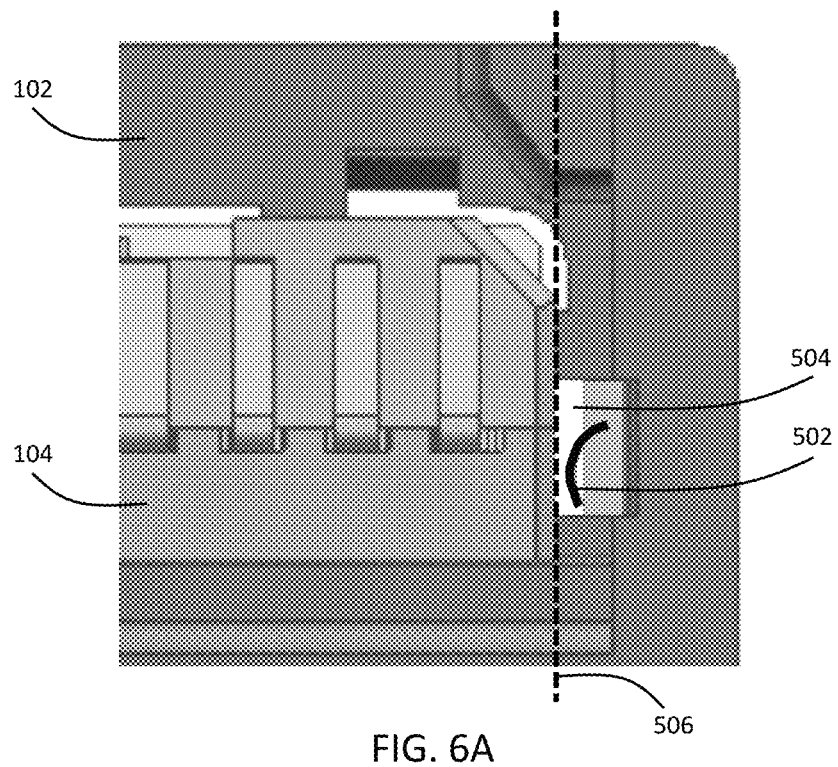
FIG. 6A depicts an enhanced front view of a single shape-memory alloy retaining clip positioned within the inner wafer subsequent to reflow, in accordance with an embodiment of the present invention.
Figure 6B:
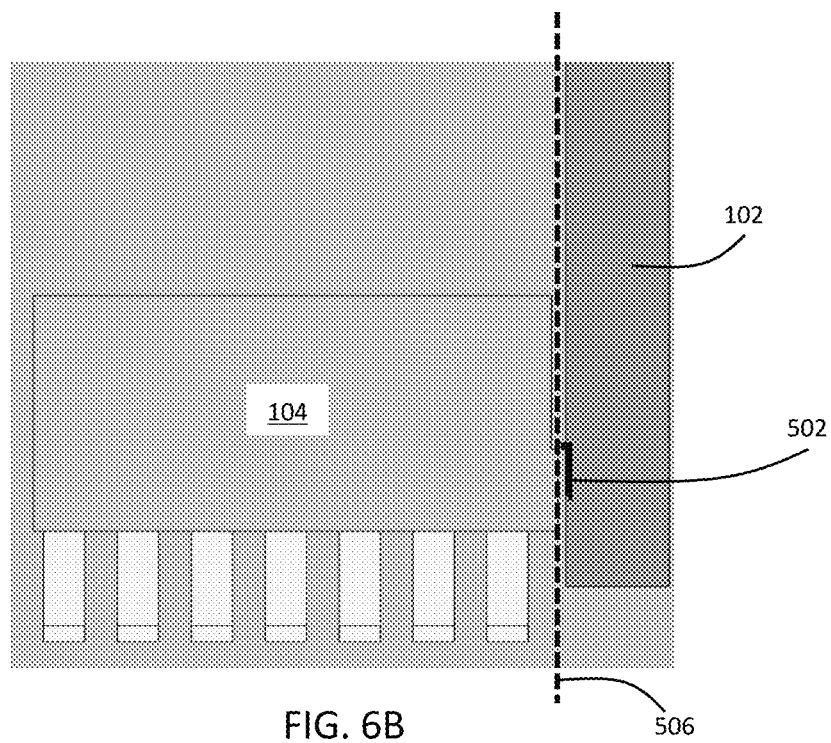
FIG. 6B depicts an enhanced cutaway side view of a single shape-memory alloy retaining clip positioned within the inner wafer subsequent to reflow, in accordance with an embodiment of the present invention.

FIG. 6A depicts an enhanced front view of a single shape-memory alloy retaining clip positioned within the inner wafer subsequent to reflow, in accordance with an embodiment of the present invention. In a disengaged position subsequent to reflow, memory metal arm 502 is retracted and does not cross interference plane 506, thus allowing for movement of inner wafer 104 within outer shell 102. The movement of outer shell 102 relative to inner wafer 104 allows for outer shell 102 to be pressed to the laminate surface of the PCBA subsequent to reflow and cooling. FIG. 6B depicts an enhanced cutaway side view of a single shape-memory alloy retaining clip positioned within the inner wafer subsequent to reflow, in accordance with an embodiment of the present invention. The enhanced cutaway side view of the embodiment discussed in FIG. 6A illustrates outer shell 102 and inner wafer 104, where memory metal arm 502 is retracted and in a disengaged position. In the disengaged position, no portion of memory metal arm 502 crossed interference plane 506, thus allowing for outer shell 102 to slide independently from inner wafer 104, perpendicular to interference plane 506.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 7:
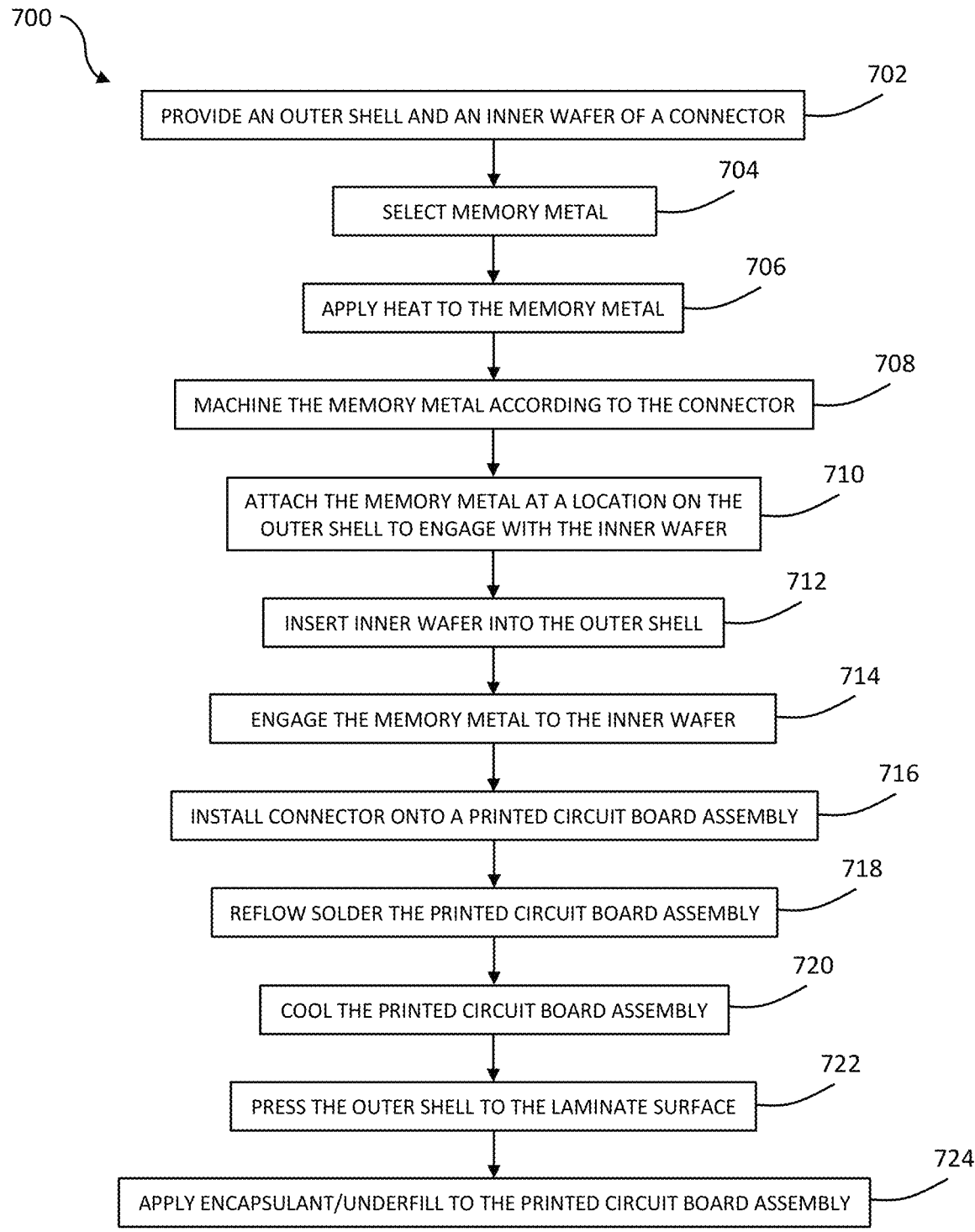
FIG. 7 depicts a process for assembling and mounting an on-the-substrate (OTS) connector with shape-memory alloy retaining clips onto a printed circuit board assembly (PCBA), in accordance with an embodiment of the present invention.

FIG. 7 depicts a process for assembling and mounting an on-the-substrate (OTS) connector with shape-memory alloy retaining clips onto a printed circuit board assembly (PCBA), in accordance with an embodiment of the present invention.

The process includes providing an outer shell and inner wafer of a connector (702). In this embodiment, the process includes providing an outer shell and an inner wafer of an OTS connector, where the inner wafer slides into the outer shell. The outer shell housing the inner wafer form the OTS connector and to prevent movement of the inner wafer within the outer shell, memory metal retaining clips are utilized to provide an interference between the outer shell and the inner wafer. The process further includes selecting a memory metal (704). Examples of memory metals (i.e., shape-memory alloys) include Copper-Aluminum-Nickel and Nickel-Titanium (NiTi), often referred to as Nitinol. In this embodiment, Nitinol is selected as the memory metal due to a shape transition temperature being in the 90° C. to 110° C. range. The shape transition temperature represents the temperature at which a deformed memory metal returns to a pre-deformed shape when heat is applied.

The process further includes applying heat to the memory metal (706) and machining the memory metal according to the connector (708). The memory metal is heated to the shape transition temperature utilizing one or more thermal methods that includes baking, handheld heating apparatus, laser, induction, and radiant heat. In this embodiment, the memory metal (Nitinol) is heated to a value in the 90° C. to 110° C. range and the memory metal is machined to form the memory metal retaining clip. Dimensions and a shape of the memory metal retaining clip machined from the memory metal are based on dimensions and shape of the outer shell and the inner wafer of the OTS connector.

The process further includes attaching the memory metal at a location on the outer shell to engage with the inner wafer (710). Attaching the memory metal at a location on the outer shell can include utilizing mounting methods including but not limited to heat staking, adhesives, and mechanical molding features. In one embodiment, multiple memory metal retaining clips are attached at multiple voids within the outer shell to engage with multiple areas on the inner wafer, where engagement of the multiple memory metal retaining clips secures outer shell to inside wafer. In a disengaged position, each of the multiple memory metal retaining clip is not actuated and does not cross an interference plane between the outer shell and the inner wafer, thus allowing for movement of inner wafer within outer shell. A first end of memory metal retaining clip is attached to a surface within the void and a second end of the memory metal retaining is not attached to any surface and free to move upon actuation with applied heat. The process further includes inserting the inner wafer into the outer shell (712) and engaging the memory metal to the inner wafer (714). Each of the memory metal retaining clips attached to the outer shell mechanically engage with a corresponding location on the inner wafer to secure the inner wafer to the outer shell to form the OTS connector by one or more means.

The process further includes installing the connector onto a printed circuit board assembly (716). Prior to installing the OTS connector onto the PCBA, the OTS connector is typically shipped from a vendor that manufactured the OTS connector to a manufacturing facility producing the PCBA on which the OTS connector is to be mounted. Since the memory metal retain clips have been actuated, the outer shell interferes with the inner wafer and prevents any movement of the inner wafer relative to the outer shell. As a result, a seating plane of multiple SMT leads of the inner wafer is maintained during the shipping and handling portion of the assembling and mounting process. Installing the OTS connector onto the PCBA includes aligning the multiple SMT leads of the inner wafer with corresponding landing pads on the PCBA, where each landing pad include solder paste for subsequently electrically and mechanically coupling the multiple SMT leads of the inner wafer. The process further includes reflow soldering the connector onto the printed circuit board assembly (718). The solder paste between each landing pad and each of the multiple SMT leads of the inner wafer reflows in a molten state, creating a permanent solder joint between the landing pads and the multiple SMT leads of the inner wafer. During the reflow soldering of the PCBA, each of the multiple memory metal retaining clips retract back behind the interference plane and the inner wafer is released from the outer shell of the OTS connector.

The process further includes cooling the printed circuit board assembly (720) and pressing the outer shell to the laminate surface (722). Since the reflow of the PCBA caused each of the multiple memory metal retaining clips to retract back behind the interference plane, the inner wafer is free to independently move from the outer shell. However, since the multiple SMT leads of the inner wafer were solder to the landing pads, the inner wafer remains fixed to the PCBA. As result, applying a force to the outer shell, results in the outer shell being pushed to the laminated surface of the PCBA. The process further includes applying encapsulate/underfill to the printed circuit board assembly (724). The encapsulant/underfill bonds the OTS connector to the substrate on the PCBA.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims

What is claimed is:

1. A connector assembly for securing an inner wafer to an outer shell of an electrical connector with a shape-memory alloy, the connector assembly comprising:
   the inner wafer of the electrical connector includes a corresponding engagement area on an outside surface of the inner wafer, wherein the inner wafer is slidable into a cavity of the outer shell of the electrical connector, wherein the outer shell includes a void formed on an inner surface of the outer shell aligns with the corresponding engagement area on the outside surface of the inner wafer, when the inner wafer is seated in the cavity of the outer shell;
      wherein the inner wafer position in the outer shell is such that one or more electrical leads of the inner wafer protrude beyond a seating plane of the electrical connector when the void located on the inner surface of the outer shell aligns with the corresponding engagement area on the outside surface on the inner wafer; and
   a first end of the shape-memory alloy coupled to the void located on the inner surface of the outer shell opposite the corresponding engagement area on the outside surface of the inner wafer, wherein the shape-memory alloy in an actuated position extends beyond an interface plane between the void located on the inner surface of the outer shell and the corresponding engagement area on the outside surface of the inner wafer, and wherein the shape-memory alloy in the actuated position interferes with the corresponding engagement area securing the inner wafer to the outer shell.

2. The connector assembly of claim 1, wherein the shape-memory alloy in the actuated position prevents movement of the inner wafer in the cavity of the outer shell.

3. The connector assembly of claim 1, wherein a second end of the shape-memory alloy in an actuated position extends beyond the interference plane between the void located on the inner surface of the outer shell and the corresponding engagement area on the outside surface of the inner wafer.

4. The connector assembly of claim 3, wherein the shape-memory alloy in the actuated position prevents movement of the inner wafer in the cavity of the outer shell.

5. The connector assembly of claim 4, wherein the interference plane is parallel to a direction in which the inner wafer slides into the cavity of the outer shell.

6. The connector assembly of claim 1, further comprising:
   the one or more electrical leads of the inner wafer contacts corresponding one or more landing pads on a printed circuit board assembly (PCBA).

7. The connector assembly of claim 6, wherein the shape-memory alloy in the actuated position prevents movement of the one or more electrical leads of the inner wafer relative to the outer shell.

8. A connector assembly for securing an inner wafer to an outer shell of an on-the-substrate (OTS) connector with a shape-memory alloy the connector assembly comprising:
   the inner wafer of the OTS connector includes a corresponding engagement area on an outside surface of the inner wafer, wherein the inner wafer is slidable into a cavity of the outer shell of the OTS connector, wherein the outer shell includes a void formed on an inner surface of the outer shell aligns with the corresponding engagement area on the outside surface of the inner wafer, when the inner wafer is seated in the cavity of the outer shell;
   a plurality of surface-mount technology (SMT) leads of the inner wafer mounted onto a plurality of landing pads on a printed circuit board assembly (PCBA);
      wherein the inner wafer position in the cavity of the outer wafer is such that the plurality of SMT leads of the inner wafer protrude beyond a seating plane of the OTS connector when the void located on the inner surface of the outer shell aligns with the corresponding engagement area on the outside surface on the inner wafer; and
   a first end of the shape-memory alloy coupled to the void located on the inner surface of the outer shell opposite the corresponding engagement area on the outside surface of the inner wafer, wherein the shape-memory alloy in an actuated position extends beyond an interference plane between the void located on the inner surface of the outer shell and the corresponding engagement area on the outside surface of the inner wafer, and wherein the shape-memory alloy in the actuated position interferes with the corresponding engagement area to secure the inner wafer within the cavity of the outer shell of the OTS connector.

9. The connector assembly of claim 8, wherein the shape-memory alloy in the actuated position prevents movement of the inner wafer in the cavity of the outer shell of the OTS connector.

10. The connector assembly of claim 8, wherein a second end of the shape-memory alloy in the actuated position extends beyond an interference plane between the void located on the inner surface of the outer shell and the corresponding engagement area on the outside surface of the inner wafer.

11. The connector assembly of claim 10, wherein the shape-memory alloy in the actuated position prevents movement of the inner wafer in the cavity of the outer shell.

12. The connector assembly of claim 11, wherein the interference plane is parallel to a direction in which the inner wafer slides into the cavity of the outer shell.

13. The connector assembly of claim 8, wherein the shape-memory alloy in the actuated position prevents movement of the plurality of SMT leads of the inner wafer relative to the outer shell of the OTS connector.

\* \* \* \* \*